United States Patent [19]
Larkin et al.

[11] 3,816,367
[45] June 11, 1974

[54] FLAME RETARDANT COMPOSITIONS
[75] Inventors: William A. Larkin, Morristown; John J. Kostrowski, Budd Lake; Irving Touval, Edison, all of N.J.
[73] Assignee: M & T Chemicals Inc., Greenwich, Conn.
[22] Filed: May 31, 1972
[21] Appl. No.: 258,326

Related U.S. Application Data
[63] Continuation-in-part of Ser. No. 155,212, June 12, 1971, which is a continuation-in-part of Ser. No. 874,081, Nov. 4, 1969, abandoned.

[52] U.S. Cl. ........ 260/29.6 R, 106/15 FP, 117/137, 252/8.1, 260/41 B, 260/45.75
[51] Int. Cl. .......................... C08f 45/24, C09d 5/14
[58] Field of Search ........ 106/15 FP; 117/136, 137; 252/8.1; 260/41, 41 B, 45.75 R, 29.6 R

[56] References Cited
UNITED STATES PATENTS
3,034,939  5/1962  Newkirk et al............. 106/15 FP X
3,458,327  7/1969  Fraser ......................... 106/15 FP X
3,560,441  2/1971  Schwarcz et al. ........... 106/15 FP X

*Primary Examiner*—Harry Wong, Jr.
*Attorney, Agent, or Firm*—Kenneth G. Wheeles; Robert P. Auber; Robert Spector

[57] ABSTRACT

The combination of one or more antimony oxides specified antimonates, magnesium hydroxide and a halogen source imparts useful flame retardancy to a variety of synthetic polymers. In addition, the gradual increase in the viscosity of aqueous dispersions of the aforementioned combination which is observed using other magnesium compounds is not apparent using the hydroxide.

15 Claims, No Drawings

FLAME RETARDANT COMPOSITIONS

BACKGROUND

This application is a continuation-in-part of application Ser. No. 155,212, filed June 12, 1971, which is in turn a continuation-in-part of application Ser. No. 874,081, filed Nov. 4, 1969, and now both abandoned.

This invention relates to improved flame retardant polymer compositions which generate minimal amounts of smoke during combustion. The invention further relates to improved flame retardant compositions wherein magnesium compounds replace a portion of the antimony compounds which, in combination with a halogen source, are effective flame retarding agents for synthetic organic polymers.

It is well known that antimony compounds significantly improve the flame retarding performance of halogen-containing materials such as halogenated organic compounds. The oxides of trivalent and pentavalent antimony are preferred for this application, and are often employed in combination with other compounds as the active flame-retarding component. As an example, U.S. Pat. No. 3,560,441 discloses that a finely divided fused mixture of antimony oxide and certain glass-forming inorganic salts such as sodium borate and sodium antimonate when employed together with a halogen source impart flame retardancy to a variety of polymers without adversely affecting the clarity of the polymer compositions to any appreciable extent.

It has been found that a portion of the antimony compounds present in prior art flame retardant polymer compositions can be replaced by magnesium compounds, which are considerably less expensive, without any significant loss in flame retardancy or increase in the amount of smoke generated during combustion. A number of magnesium compounds, including the oxide, are less than satisfactory for this purpose because they considerably shorten the period of time during which aqueous dispersions of the flame retarding components can be stored prior to being combined with polymers which are subsequently either shaped or applied as coatings. The viscosity of the aqueous dispersions gradually increases to the extent that the compositions may completely solidify. It has now been found that the hydroxide is unique among magnesium compounds in that this undesirable increase in viscosity does not occur to any appreciable extent.

SUMMARY OF THE INVENTION

The present invention provides improved flame retardant polymer compositions comprising 1) at least one thermally unstable chlorine-containing organic polymer or at least one non-chlorinated polymer in combination with greater than 1 percent by weight, based on said composition, of thermally unstable chlorine-containing material; 2) a nonfused mixture comprising between 70 to 90 percent by weight of at least one antimony oxide with between 10 and 30 percent by weight of a compound selected from the group consisting of sodium antimonate, potassium antimonate and magnesium antimonate and 3) a magnesium compound, wherein the improvement resides in the presence of magnesium hydroxide as the magnesium compound at a concentration of between 5 and 15 percent, based on the combined weight of the antimony and magnesium compounds. The magnesium hydroxide replaces a portion of the more expensive antimony compounds without significantly reducing the effectiveness of the flame retardant.

DETAILED DESCRIPTION OF THE INVENTION

Unfused mixtures of antimony oxides with sodium, potassium, or magnesium antimonates are particularly effective additives for synthetic polymers which also contain a thermally unstable source of chlorine. These compositions exhibit a high degree of flame retardancy and minimal smoke evolution upon ignition. The generation of excessive smoke during burning is most undesirable in that it may interfere with efforts to extinguish the flames. In addition, the smoke may be highly toxic. Antimony compounds are relatively costly when compared with other flame retardants, which has discouraged the use of these compounds for certain applications. By replacing between 5 and 15 percent by weight of the antimony compounds with magnesium hydroxide, the cost of the flame retarding agent is considerably reduced without adversely affecting its performance to any significant extent.

The combustible materials to be treated in accordance with this invention may be any of those materials known to be combustible, such as various polymeric materials which include plastics in sheet form, in massive form, in powder form, etc. Typical of such plastics are vinyl-type polymers characterized as homopolymers and copolymers of vinyl chloride, vinylidene chloride, styrene, etc.; acrylic-type polymers such as homo- and copolymers of ethyl acrylate, butyl acrylate, acrylonitrile, methyl methacrylate, acrylamide, etc.; polyolefins or related polymers such as homo- and copolymers of ethylene, propylene, isoprene, butadiene, etc.; condensation polymers, for example poly(ethylene terephthalate), and polyethers such as poly(propylene oxide). Other suitable polymers include polyamides, polycarbonates, polyurethanes, epoxy resins, and polyester-styrene resins. The combustible materials also include textiles, including those formed from polymeric materials, or cellulose-type wood products such as paper or fabrics coated with plastic materials.

A preferred feature of this invention is that it provides flame retardant poly(vinyl chloride) in the form of flexible sheeting, typically in thickness of 150 to 0.01 millimeters.

The thermally unstable chlorine-containing materials which find use in the practice of this invention are any one of those materials which decompose on heating to yield as one of the decomposition products, hydrogen chloride. Typically, these materials include poly(vinyl chloride), chlorinated paraffin waxes including 70 percent chlorinated paraffin wax, i.e., paraffin wax which has been chlorinated until it contains 70 percent by weight of chlorine, 40 percent chlorinated paraffin wax, chlorinated terphenyls, chlorinated rubber, etc. Typically, these chlorine-containing materials are used in amounts within the range of between about 1 and 100 percent by weight of the polymeric organic plastic material to be rendered flame resistant. The preferred thermally unstable chlorine-containing materials are the chlorinated paraffin waxes. One of the materials which is particularly suitable for use in this invention are chlorinated paraffin waxes. It will be understood that when the polymeric material which is rendered flame resistant also functions as the thermally unstable chlorine-containing material, e.g. poly(vinyl chloride), poly(vinylidene chloride), chlorinated polyester resins, etc., it is not necessary to add an additional amount of a thermally unstable chlorine-containing material.

The novel flame retardants of this invention are prepared by blending together 60 to 80 percent by weight of an antimony oxide, preferably antimony trioxide $Sb_2O_3$, and 15 to 25 percent by weight of a compound selected from the group consisting of potassium antimonate, sodium antimonate, or magnesium antimonate and 5 to 15 percent by weight of magnesium hydroxide.

The novel smoke-inhibiting and flame proofing compositions of this invention comprise the following components:

TABLE I

| Component | Minimum | Maximum |
| --- | --- | --- |
| Antimony Oxide | 60 | 80 |
| Antimonate | 15 | 25 |
| Magnesium Hydroxide | 5 | 15 |

Formulation of the foregoing compositions is carried out by blending together the components and adding the resultant mixture to the combustible composition. If desired, however, each of the materials may be separately and sequentially added to the composition.

When the organic polymeric plastic materials employed is one which may function as the thermally unstable chlorine-containing material, e.g. poly(vinyl chloride), poly(vinyl-idene chloride) or chlorinated polyester resins, it is usually not necessary to add an additional amount of thermally unstable chlorine-containing material. In these instances the flame retarding components should be present in an amount of from 1 to 12 percent of the halogen-containing organic polymeric plastic material.

When the organic polymeric plastic material to be flame retarded is not one which functions as a thermally unstable chlorine-containing material, e.g. polyethylene, poly(styrene), etc., it is necessary to include a thermally unstable chlorine-containing material, e.g. chlorinated paraffin wax, in an amount within the range of between about 1 percent and up to 12 percent by weight, based upon the weight of the organic polymeric plastic material. The flame proofing and smoke prevention composition of this invention should be added in an amount of at least 1 to 55 percent, by weight of the organic polymeric plastic material to be rendered flame proof and smoke proof. Preferably in this latter embodiment, the thermally unstable chlorine-containing material is present in an amount of 5.5 percent by weight of the organic polymeric plastic material. Commonly, the novel flame retardant and smoke proofing combination of this invention and the thermally unstable chlorine-containing material are blended together before they are mixed with the polymeric material. Where this practice is employed, the flame retardant composition is formed by mixing 12 to 1.2 percent of the composition of this invention, based upon the weight of plastic material and 1 to 12 percent of a thermally unstable chlorine-containing material. Preferably, the flame proofed and smoke proofed composition will contain substantially equal parts of chlorine-containing material and the mixture of antimony and magnesium compounds, i.e. about 0.5 to 2.0 parts of the former per part of the latter.

The flame resistant plastic organic compositions of this invention may be formulated or blended by milling, i.e. Banbury blending, etc. The compositions obtained are then formed or molded by injection molding, extrusion, thermoforming, laminating, calendering, etc. The polymeric material, e.g., low-density polyethylene, is added to a two roller, differential mill steam-heated to about 149°C. When the polymeric material becmes molten, a well-blended mixture of the combined antimony compounds and magnesium hydroxide and 70 percent chlorinated paraffin wax, is added uniformly to the molten mass, and the resulting composition milled for about five minutes. In order to obtain thorough mixing, the composition is removed from the mill and replaced several times. When the mixing is complete, the mill rolls are cooled and the flame resistant plastic composition removed. This composition is molded at 121°C. and a pressure of about 10,000 psi to form a flexible sheet from which samples can be cut for flame retardancy tests.

In order to clearly point out the novel features of this invention, illustrative compositions were prepared as disclosed in the following examples. The flexible poly(vinyl chloride) formulation employed is set forth in Table II.

TABLE II

| | Parts per hundred parts resin |
| --- | --- |
| Poly(vinyl chloride) resin | 100 |
| Di-octyl phthalate | 45 |
| Epoxydized soya bean oil | 5 |
| Stearic acid | 0.25 |
| Stabilizer-dibutyltin bis (isooctyl maleate) | 1.0 |
| Flame retardant as indicated | — |

The test samples used to evaluate flame retardancy were prepared using the following procedure:

The poly(vinyl chloride) resin was placed on a two-roller, steam-heated differential speed mill maintained at a temperature of 163°C. When the mass became molten, a well-blended mixture of the remaining components was added to the mill and the mixture was blended for an additional 1 to 2 minutes. The total milling time was 5 minutes.

The films obtained were then subjected to a flame spread and smoke evolution test specifically designed to measure the smoke evolution and flame spread of burning materials. This test was carried out using a modified S.P.I. flame test chamber. The smoke measuring assembly was directly attached to the top section of the unit. The device consists of a 3 inch diameter, 18 inch long stainless steel hollow tube with a photoelectric cell at one end and a light source at the opposite end. The rate of smoke evolution was calculated as a function of the degree of reduction in light transmission along the smoke tube. The smoke was drawn past the photo-cell by use of a variable speed exhaust fan. The change in light transmission was proportional to the amount of smoke evolved from the burning sample and was recorded on an integrator attached to the photo-cell unit. The flame spread was measured in length (inches) and correlated to the smoke evolved by the sample, the latter being expressed as units of smoke per inch of sample burned.

EXAMPLE 1

This example demonstrates the improved viscosity stability of aqueous dispersions of antimony compounds, a halogen source and magnesium hydroxide compared with a similar dispersion wherein magnesium oxide is substituted for the hydroxide.

Eight parts by weight of antimony trioxide, 2 parts of sodium antimonate and 1 part of either magnesium oxide (sample 1) or magnesium hydroxide (sample 2) were thoroughly blended together. The final mixture contained 71.3 percent antimony of which 59.8 percent had a valence of +3 and the remainder had a valence of +5. Ten parts of this mixture were added to 100 parts of a paraffin wax containing 70 percent by weight of chlorine. The solid materials were combined with sufficient water to form a fluid dispersion. Viscosity measurements were made using the initial dispersion and were repeated after the dispersion had been allowed to stand for 24 and 96 hours. The viscosity measurements were obtained using a Brookfield viscometer equipped with a No. 4 spindle rotating at 10 revolutions per minute. The viscosity values are recorded in Table III together with those obtained using controls which were a) an aqueous dispersion of the chlorinated paraffin wax without any flame retardant (sample 3) and b) an aqueous dispersion of antimony trioxide (sample 4).

TABLE III

| Sample No. | Viscosity (in centipoises) after | | |
|---|---|---|---|
| | 0 Hours (initial) | 24 Hours | 96 Hours |
| 1 (MgO) | 11,840 | 296,000 | Solid |
| 2 [Mg(OH)$_2$] | 14,000 | 13,280 | 14,240 |
| 3 (control a) | 9,200 | 9,200 | 9,200 |
| 4 (control b) | 11,960 | 14,200 | 14,800 |

As can readily be seen, although the viscosity of the flame retardant containing magnesium hydroxide was initially higher than the values of the other samples, the values for the hydroxide remained substantially constant while the values for the sample containing magnesium oxide exhibited an appreciable increase in viscosity over a period of 24 hours.

The flame retardancy and smoke inhibition imparted to the poly(vinyl chloride) resin formulation set forth in Table II by various flame retardants was evaluated and the results are tabulated as follows. The final mixture contained 120 parts of resin formulation and 3 parts of the specified flame retarding components.

TABLE IV

| Flame Retardant | Flame Spread* (inches burned/second) | Smoke* (units per in. burned) |
|---|---|---|
| Antimony Trioxide | 1.14 | 1049 |
| Antimony Trioxide (80 pts.) Sodium Antimonate (20 pts.) Magnesium Oxide (10 pts.) | 1.00 | 798 |
| Antimony Trioxide (80 pts.) Sodium Antimonate (20 pts.) Magnesium Hydroxide (10 pts.) | 1.14 | 904 |
| None | 7.00 | too dense for measurement |

*Average value for 10 samples

Excellent flame and smoke control was achieved using the formulation containing the antimony compounds with magnesium hydroxide even though this formulation contained substantially less of the relatively expensive antimony compounds. In addition, the viscosity of the aqueous dispersion of antimony compounds and magnesium hydroxide remained constant over a relatively long period of time.

Although this invention has been illustrated by reference to specific embodiments, modifications thereof which are clearly within the scope of the invention will be apparent to those skilled in the art.

What is claimed is:

1. An improved aqueous dispersion for use as a flame retardant with synthetic organic polymeric materials, said aqueous dispersion consisting essentially entirely of
   1. at least one thermally unstable chlorine source selected from the group consisting of chlorinated paraffin waxes, chlorinated terphenyls, chlorinated rubber and polyvinyl chlorides;
   2. a non-fused mixture comprising between 70 and 90 percent by weight of at least one antimony oxide with between 10 and 30 percent by weight of a compound selected from the group consisting of sodium antimonate, potassium antimonate and magnesium antimonate, and
   3. a magnesium compound, wherein the improvement resides in the presence of magnesium hydroxide as the magnesium compound in a concentration of between 5 and 15%, based on the total weight of antimony and magnesium compounds.

2. A composition as described in claim 1 wherein said antimony oxide is antimony trioxide.

3. A composition as described in claim 2 wherein the concentration of antimony trioxide is within the range of between about 60 and 80 percent, based on the weight of antimony and magnesium compounds.

4. A composition as described in claim 1 wherein said antimonate is sodium antimonate.

5. A composition as described in claim 4 wherein the concentration of sodium antimonate is within the range of between about 15 and 25 percent, based on the weight of antimony and magnesium compounds.

6. An improved flame retardant polymer composition consisting essentially entirely of
   1. at least one thermally unstable chlorine source selected from the group consisting of polyvinyl chloride and non-chlorine-containing polymers, the latter in combination with at least 1 percent by weight, based on said composition, of a thermally unstable chlorine-containing material selected from the group consisting of chlorinated paraffin waxes, chlorinated terphenyls and chlorinated rubber;

2. a non-fused mixture comprising between 70 and 90% by weight of at least one antimony oxide and between 10 and 30 percent by weight of a compound selected from the group consisting of sodium antimonate, potassium antimonate and magnesium antimonate, and 3. a magnesium compound, wherein the improvement resides in the presence of magnesium hydroxide as the magnesium compound at a concentration of between 5 and 15%, based on a combined weight of the non-fused mixture and magnesium compound.

7. A polymer composition as described in claim 6 wherein said thermally unstable chlorine source is present in an amount within the range of between about 1 and 100%, based on the weight of said composition.

8. A polymer composition as described in claim 7 wherein the chlorine source is a chlorinated paraffin wax.

9. A polymer composition as described in claim 7 wherein the chlorine source is poly(vinyl chloride).

10. A polymer composition as described in claim 6 wherein said antimony oxide is antimony trioxide.

11. A polymer composition as described in claim 10 wherein the concentration of antimony trioxide is within the range of between about 60 and 80 percent, based on the total weight of antimony and magnesium compounds.

12. A polymer composition as described in claim 6 wherein said antimonate is sodium antimonate.

13. A polymer composition as described in claim 12 wherein the concentration of sodium antimonate is within the range of between about 15 and 25 percent, based on the total weight of antimony and magnesium compounds.

14. A polymer composition as described in claim 8 wherein the concentration of chlorinated paraffin wax is between about 1 and 12 percent of said material.

15. A polymer composition as described in claim 6 wherein the non-fused mixture is present in an amount within the range of between about 1 and 12 percent, based on the weight of said flame retardant polymer composition.

* * * * *

UNITED STATES PATENT OFFICE
CERTIFICATE OF CORRECTION

Patent No. 3,816,367           Dated June 11, 1974

Inventor(s) William A. Larkin, John J. Kostrowski and Irving Touval

It is certified that error appears in the above-identified patent and that said Letters Patent are hereby corrected as shown below:

Page 1, Abstract of the Disclosure - line 2 -

Insert a comma (,) following the word "oxides".

Column 2, line 55 - Insert --)-- following the word "chlorine".

Column 2, lines 62-64 - Delete the sentence "One of the materials which is particularly suitable for use in this invention are chlorinated paraffin waxes".

Column 2, line 62 to Column 3, line 3
                    - Delete the sentence beginning
"It will be understood"

Column 5, line 28 - Change "plastic materials" to read --material--.

Signed and sealed this 11th day of March 1975.

(SEAL)
Attest:

RUTH C. MASON
Attesting Officer

C. MARSHALL DANN
Commissioner of Patents
and Trademarks